Oct. 11, 1949.  C. W. SIMPSON  2,484,472
PROPULSION AID FOR VELOCIPEDES
Filed Aug. 10, 1948  2 Sheets-Sheet 1
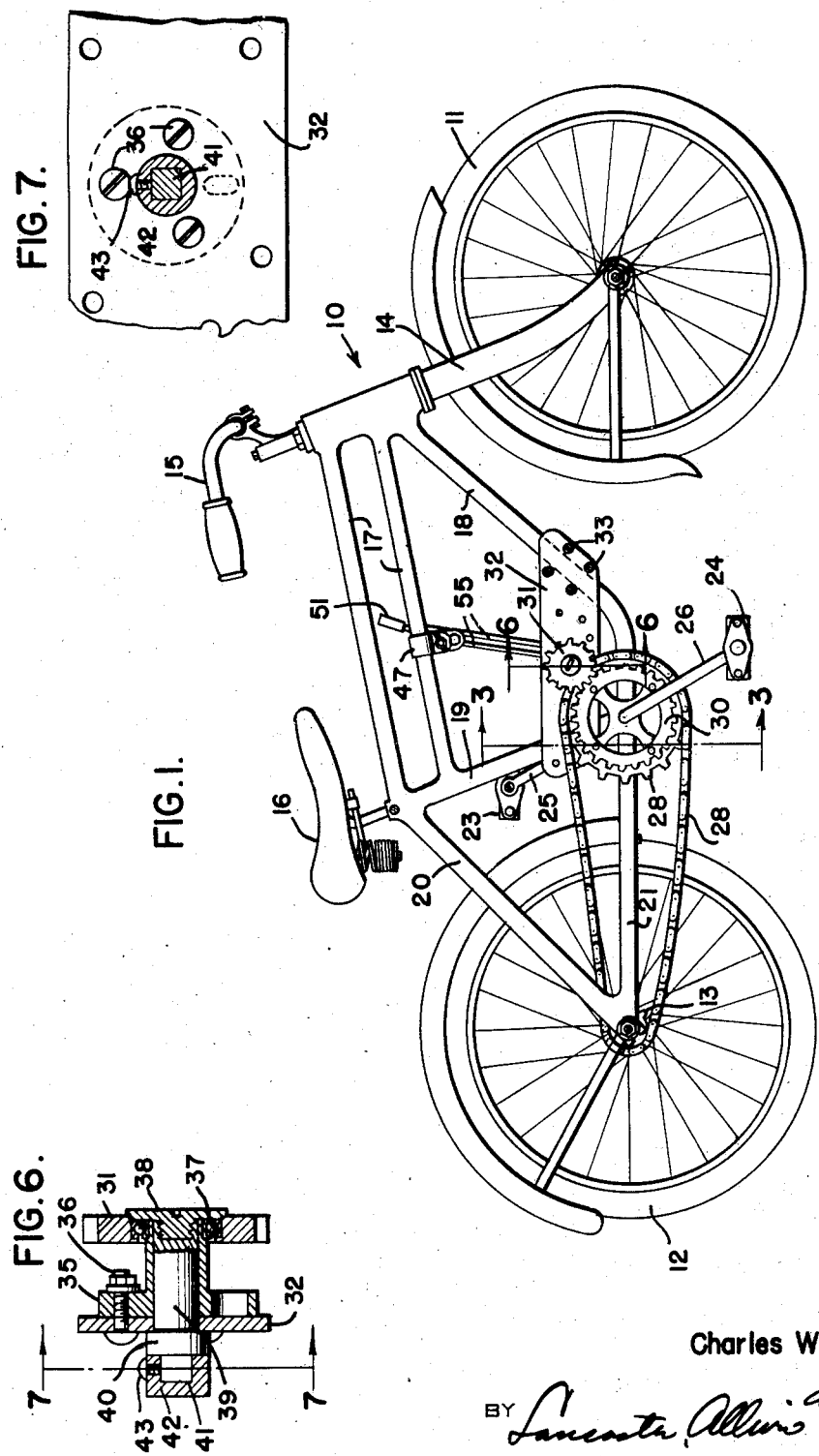
INVENTOR.
Charles W. Simpson
BY
ATTORNEYS.

Oct. 11, 1949.                C. W. SIMPSON                2,484,472
                        PROPULSION AID FOR VELOCIPEDES
Filed Aug. 10, 1948                                       2 Sheets-Sheet 2
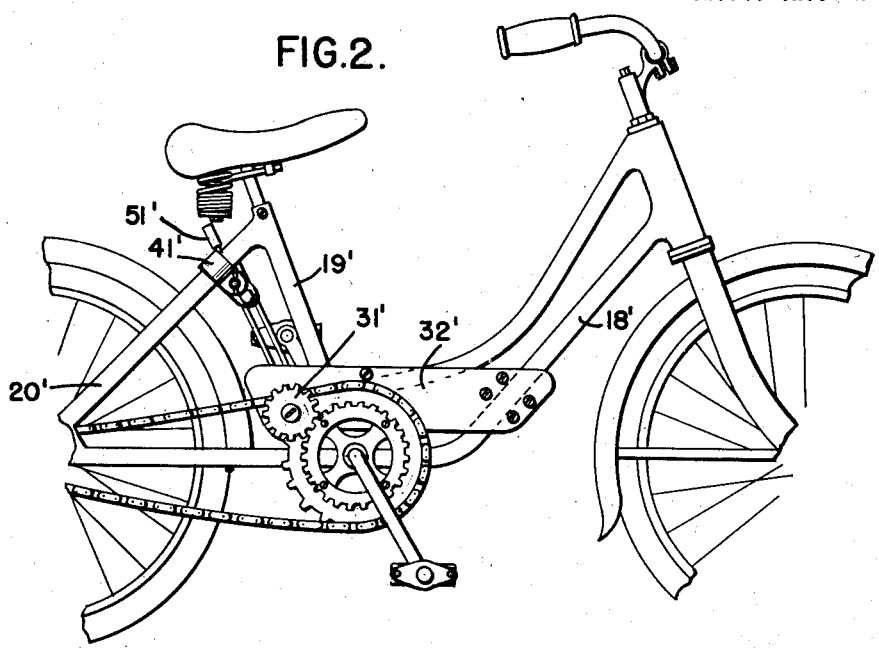
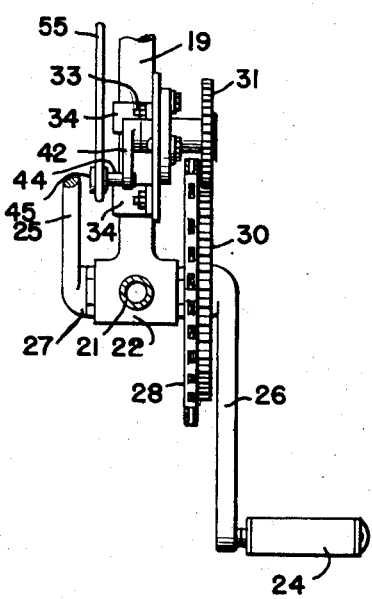
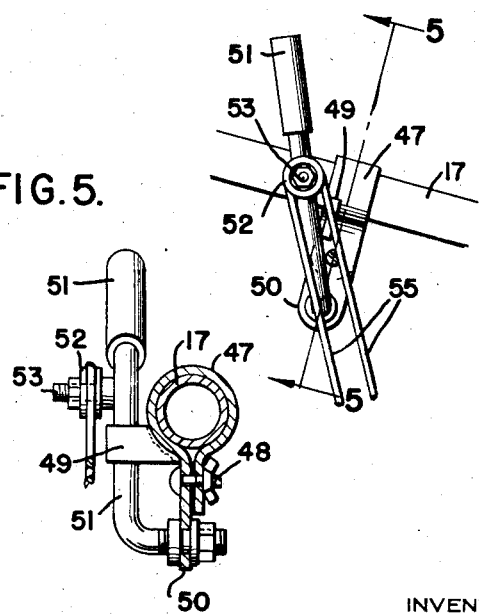
INVENTOR.
Charles W. Simpson Patented Oct. 11, 1949

2,484,472

UNITED STATES PATENT OFFICE 2,484,472

PROPULSION AID FOR VELOCIPEDES

Charles W. Simpson, Harlingen, Tex.

Application August 10, 1948, Serial No. 43,418

8 Claims. (Cl. 280—212)

The present invention relates to velocipedes, and more particularly to a propulsion aid mechanism therefor operative when the propulsion crank is in the dead center sectors. The invention may be incorporated as an integral part of factory-built velocipedes or may be supplied in a form suitable for attachment to conventional velocipedes.

When pedaling a conventional bicycle, there are two dead center positions for each rotation of the crank sprocket and crank. One dead center sector occurs when the foot pedal of the crank on one side is near the top of its arc and another occurs when the foot pedal is near the bottom of its arc. The foot pedals on both sides of the bicycle are arranged in 180 degree relationship so that downward force may be applied alternately to the pedals. But after downward force has been applied to one pedal and before it can be applied to the other, the pedals pass through a dead center sector. In the absence of a propulsion aid device, the momentum of the bicycle is relied upon to get through the dead center sectors. When pedaling up a hill, great difficulty is experienced because the bicycle quickly loses its momentum after one pedal has been pushed down and before the other pedal reaches a position where force can be applied to it. The same difficulty is experienced when the bicycle is moving slowly on the level, or against a resisting wind.

It is, of course, more desirable and efficient to apply a constant uninterrupted driving force to the wheels of a vehicle. Since it is impossible to apply a constant uninterrupted rotational force through the feet to bicycle pedals, it is the general object of this invention to provide a velocipede including means for transforming the intermittent pushing force of the rider's feet into a constant uninterrupted rotational force on the driving wheel.

In starting a bicycle from a standstill, it is customary to first move it to a position in which one pedal is past its upper dead center position. It is therefore another object of this invention to provide a velocipede which is easy to start regardless of the positions of the pedals.

It is a further object to provide a velocipede having a propulsion aid mechanism which may be rendered inoperative at the will of the rider as when coasting and with his feet off pedals.

It is a further object to provide a propulsion aid mechanism which may be readily attached to conventional bicycles.

It is a further object to provide a propulsion aid mechanism which is easy and economical to manufacture and may be supplied to the user at nominal expense.

In pursuance of these and other objects which will be apparent to those skilled in the art, I provide a spur gear secured to the bicycle crank sprocket and meshed with a pinion journaled on the frame. The pinion has a pitch diameter half that of the spur gear. Resilient means is connected between an eccentric pin on the pinion and a point on a lever pivotally mounted on the frame of the bicycle. When the lever is in the operative position, the resilient means aids the propulsion of the bicycle twice during each rotation of the crank sprocket. The parts are geometrically arranged so that propulsion is aided when the bicycle pedals are in their dead center sectors.

Referring briefly to the drawings wherein I show preferred embodiments of the invention as applied to a man's bicycle and a woman's bicycle:

Figure 1 is a side elevation of a man's bicycle equipped with the propulsion aid device.

Figure 2 is a fragmentary side elevation of a woman's bicycle equipped with the propulsion aid device.

Figure 3 is a sectional view of the mechanism taken on the line 3—3 of Figure 1.

Figure 4 is a fragmentary side elevation looking from the side opposite that shown in Figure 1 and illustrating details of the lever means for rendering the propulsion aid device operative and inoperative.

Figure 5 is a sectional view taken on the line 5—5 of Figure 4 and further illustrating details of the lever means.

Figure 6 is another sectional view of the mechanism taken on the line 6—6 of Figure 1 and illustrating the pinion assembly.

Figure 7 is a sectional view taken on the line 7—7 of Figure 6.

Referring now in greater detail to the drawings, Figure 1 shows a conventional man's bicycle including a frame generally designated 10, wheels 11 and 12, rear wheel sprocket 13, fork 14, handle bars 15 and saddle 16. The frame 10 includes longitudinal bars 17, a front depending member 18, a central depending member 19, a rear depending member 20, and a bottom longitudinal member 21. As shown in Figure 3, a bearing 22 is provided at the junction of frame members 18, 19 and 21. A conventional propulsion crank includes pedals 23 and 24 on oppositely extending crank arms 25 and 26 having an intermediate portion 27 journaled in bearing 22. A crank sprocket 28 secured to the intermediate portion 27 of the propulsion crank carries a sprocket chain 28 also passing over rear wheel sprocket 13.

A spur gear 30 is fixed to the propulsion crank by being riveted, bolted or welded to the crank sprocket 28. Spur gear 30 is meshed with a pinion 31 having a pitch diameter and number of teeth equal to one-half that of the spur gear for reasons which will be apparent as the description proceeds. The pinion 31 is rotatably mounted on a base plate 32 secured to the depending members 18 and 19 by means of bolts 33 and straps 34. As shown in Figures 6 and 7, a flanged housing 35 is secured by bolts 36 to the base plate 32. The pinion 31 rotates on ball bearings 37 carried by the flanged housing 35 and the pinion is mounted on the end portion of crank shaft 39, is held in place by means of a cap screw 38 threaded in the crank shaft 39 which rotates with the pinion 31 and extends through the pinion 31, flanged housing 35 and base plate 32. The pinion crank shaft 39 is provided with a thrust shoulder 40 engaging the base plate 32, and a polygonal extension 41. A pinion crank arm 42 has a polygonal recess matching the extension 41 and a set screw 43 for securing the arm 42 thereto. A crank pin 44 extends from the pinion crank arm 42 and is provided with a freely rotatable sleeve or grooved pulley 45 thereon. It is apparent that the pinion 31 is provided with an eccentric pin, namely, the crank pin 44.

One of the longitudinal bars 17 of the frame 10 is circumscribed by a strap clamp 47 tightened thereon by means of a thumb-bolt 48. Strap clamp 47 includes a stop bar 49 and an apertured projection 50 having journaled therein a hand lever 51. A grooved sleeve 52 is mounted on a pin 53 extending from an intermediate part of the hand lever 51.

Resilient means 55, which may be a rubber strap or a coil spring, is in the form of a loop stretched between the grooved sleeve 52 on the hand lever 51 and the grooved pulley 45 on the crank pin or eccentric 44. In the drawings, the hand lever 51 is shown in the "propulsion aid" position. The various parts of the propulsion aid mechanism are so arranged geometrically that the resilient means 55 tends to keep the hand lever 51 against the stop bar 49 as shown to advantage in Figure 4. When the rider desires to render the propulsion aid mechanism inoperative, he rotates hand lever 51 against the tension of resilient means 55 away from the stop bar 49 and around until the tension on resilient means 55 is removed. The propulsion aid device is then inoperative and will not interfere with the motion of the bicycle when coasting with feed off the pedals at any position.

The propulsion aid device as applied to a woman's bicycle is illustrated in Figure 2. It will be noted that the arrangement shown in Figure 2 differs from that shown in Figure 1 in that the pinion 31' is located rearward of the central depending frame member 19' and the hand lever 51' is mounted on the rear depending frame member 20'. These modifications are necessitated by the lack of longitudinal bars 17 on a woman's bicycle. It is within the contemplation of this invention that the base plate 32 be provided with a plurality of appropriately placed holes so that the same propulsion aid parts may be assembled and attached to a man's bicycle after the manner shown in Figure 1 or assembled and attached to a woman's bicycle after the manner shown in Figure 2.

In operation, the propulsion aid device applies a propulsive force to crank sprocket 28 and wheel 12 twice during each revolution of the crank sprocket. The force is applied when the foot pedals 23 and 24 are in their dead center sectors, one of which is illustrated in Figure 1. Another dead center sector occurs after pedal 24 has moved 180 degrees to an upper position and pedal 23 has moved 180 degrees to a lower position. An aiding force is obtained twice during each rotation of the sprocket 28 by reason of the pinion 31 having half the pitch diameter of the spur gear 30, thereby causing the pinion to rotate twice for each rotation of the spur gear and sprocket. When the pedals are in a dead center sector, resilient means 55, being then elongated and tensioned, tends to rotate the pinion 31 by acting through pinion crank pin 44, pinion crank arm 42 and pinion crank shaft 39. When the pedals have passed through a dead center sector and force is applied from the rider's foot, a part of the force so applied is transmitted to the rear wheel 12 and a part is applied to the resilient means 55 tensioning it and storing energy therein. In this way, the force intermittently applied to the foot pedals 23 and 24 is transformed into a constant uninterrupted force and applied to the rear wheel 12 of the bicycle. The propulsion aid device may be rendered operative or inoperative at the rider's option by merely manipulating hand lever 51.

Of course it is to be understood that this invention is not limited to the particular details as described above and shown in the drawings. It is accordingly desired that the appended claims be given a broad interpretation commensurate with the scope of the invention within the art.

I claim:

1. A propulsion aid for velocipedes having a frame and a propulsion crank journaled therein, comprising: a spur gear secured to the crank to rotate therewith, a pinion rotatably mounted on the frame and in mesh with the spur gear, the pinion and spur gear having a 2:1 speed ratio, an eccentric pin connected with the pinion, and resilient means engaged at one end with the eccentric pin and at the other end with the frame, whereby the resilient means aids the propulsion crank twice during each revolution thereof.

2. A propulsion aid for velocipedes having a frame and a propulsion crank journaled therein, comprising: a spur gear secured to the crank to rotate therewith, a pinion rotatably mounted on the frame and in mesh with the spur gear, the pinion having half the diameter of the spur gear, an eccentric pin connected with the pinion, and resilient means engaged at one end with the eccentric pin and at the other end with the frame.

3. A propulsion aid for velocipedes having a frame and a propulsion crank journaled therein, comprising: a spur gear and pinion having a 1:2 speed ratio, the spur gear being secured to the crank to rotate therewith, the pinion being rotatably mounted on the frame and provided with an eccentric pin, and resilient means connected at one end with the eccentric pin and at the other end with the frame, the eccentric pin and resilient means being arranged relative to the crank to aid propulsion when the crank is in the dead center sectors.

4. A propulsion aid for velocipedes having a frame, wheels, propulsion crank arm and crank sprocket, comprising: a spur gear secured coaxially to the crank sprocket, a base plate secured to the frame, a pinion rotatably mounted on the base plate and in mesh with the spur gear, the pinion having half the diameter of the spur gear, an eccentric pin connected with the pinion, and resilient means engaged at one end with the eccentric pin and at the other end with the frame, the crank arm, eccentric pin and resilient means being geometrically arranged to aid propulsion of the velocipede when the crank arm is in the dead center sector.

5. A propulsion aid for velocipedes having a frame and a propulsion crank journaled therein, comprising: a spur gear secured to the crank to rotate therewith, a pinion rotatably mounted on the frame and in mesh with the spur gear, the pinion having half the diameter of the spur gear, an eccentric pin connected with the pinion, a hand lever pivotally mounted on the frame, and resilient means engaged at one end with the eccentric pin and at the other end with the hand lever.

6. A propulsion aid for velocipedes having a frame and a crank sprocket rotatably mounted therein, comprising: a spur gear secured coaxially to the crank sprocket, a base plate secured to the frame and a pinion rotatably mounted thereon and in mesh with the spur gear, the pinion having half the diameter of the spur gear, an eccentric pin on the pinion, a hand lever pivotally mounted on the frame, and resilient means engaged at one end with the eccentric pin and at the other end with the hand lever, the hand lever having one position in which the resilient means is tensioned and aids the crank sprocket twice during each revolution thereof, and another position in which the resilient means is relaxed and rendered inoperative.

7. A propulsion aid attachment for conventional bicycles comprising a spur gear adapted for connection coaxially to the crank sprocket of the bicycle, a base plate and means for securing it to and between the front and central depending frame members of the bicycle, a pinion journaled in the base plate and meshed with the spur gear, an eccentric on the pinion including a pinion crank arm and crank pin, a clamp for a longitudinal bar of the bicycle frame and a projection on the clamp, and resilient means in the form of a loop engaged on the crank pin and the projection and stretched therebetween.

8. A propulsion aid attachment for conventional bicycles comprising a spur gear adapted to connection coaxially to the crank sprocket of the bicycle, a base plate and means for securing it to and between the front and central depending frame member of the bicycle, a pinion crank shaft journaled in the base plate, a pinion on one end of the pinion crank shaft and a pinion crank arm and crank pin on the other end of the pinion crank shaft, the pinion being meshed with the spur gear, a clamp for a longitudinal bar of the bicycle frame, a hand lever pivoted on the clamp and a projection on the hand lever, and resilient means in the form of a loop engaged on the crank pin and the projection and stretched therebetween.

CHARLES W. SIMPSON.

REFERENCES CITED

The following references are of record in the file of this patent:

FOREIGN PATENTS

| Number | Country | Date |
|---|---|---|
| 18,625 | Great Britain | 1891 |
| 76,338 | Austria | May 10, 1919 |
| 489,021 | France | Aug. 17, 1918 |
| 550,571 | France | Dec. 15, 1922 |